(12) United States Patent
Hosotani

(10) Patent No.: US 9,142,947 B2
(45) Date of Patent: *Sep. 22, 2015

(54) SWITCHING CONTROL CIRCUIT AND SWITCHING POWER SUPPLY APPARATUS

(71) Applicant: Murata Manufacturing Co., Ltd., Nagaokakyo-shi, Kyoto-fu (JP)

(72) Inventor: Tatsuya Hosotani, Nagaokakyo (JP)

(73) Assignee: Murata Manufacturing Co., Ltd., Kyoto (JP)

(*) Notice: Subject to any disclaimer, the term of this patent is extended or adjusted under 35 U.S.C. 154(b) by 340 days.

This patent is subject to a terminal disclaimer.

(21) Appl. No.: 13/650,190

(22) Filed: Oct. 12, 2012

(65) Prior Publication Data

US 2013/0271876 A1    Oct. 17, 2013

Related U.S. Application Data

(63) Continuation of application No. PCT/JP2011/057093, filed on Mar. 24, 2011.

(30) Foreign Application Priority Data

Apr. 16, 2010   (JP) .................................. 2010-095124

(51) Int. Cl.
*H02H 7/00* (2006.01)
*H02H 9/00* (2006.01)
(Continued)

(52) U.S. Cl.
CPC . *H02H 3/08* (2013.01); *H02M 1/36* (2013.01); *H02M 3/33507* (2013.01); *H02M 1/32* (2013.01); *H02M 3/3376* (2013.01)

(58) Field of Classification Search
CPC .............................. H02M 3/33456; H02H 3/08

USPC .................. 361/87, 29, 30, 36, 93.1, 93.9, 18
See application file for complete search history.

(56) References Cited

U.S. PATENT DOCUMENTS 4,598,351 A      7/1986 Fair et al.
7,468,877 B2*   12/2008 Oki et al. ..................... 361/93.1
(Continued)

FOREIGN PATENT DOCUMENTS

CN      1405959 A      3/2003
CN    101677216 A      3/2010
(Continued)

OTHER PUBLICATIONS

Official Communication issued in corresponding Chinese Patent Application No. 201180019375.7, mailed on Jun. 25, 2014.
(Continued)

*Primary Examiner* — Jared Fureman
*Assistant Examiner* — Lucy Thomas
(74) *Attorney, Agent, or Firm* — Keating & Bennett, LLP

(57) ABSTRACT

In a switching control circuit, a length of a soft start period is set in accordance with a time constant of an external circuit connected to a soft start terminal of a switching control IC. A current flowing through a switching element is detected at a current detection terminal. When the value of the current exceeds a first predetermined current value, a second overcurrent protection function is performed, so that a switching operation is stopped. When the value of the current exceeds a second predetermined current value, a second overcurrent protection function is performed, so that the switching element is quickly turned off and a current peak value is limited. On the basis of a voltage at the soft start terminal after the soft start period has elapsed, one of the setting and non-setting of the first overcurrent protection function is selected.

20 Claims, 11 Drawing Sheets

(51) Int. Cl.
*H02H 3/08* (2006.01)
*H02M 1/36* (2007.01)
*H02M 3/335* (2006.01)
H02H 3/00 (2006.01)
H02H 9/08 (2006.01)
H02M 1/32 (2007.01)
H02M 3/337 (2006.01)

(56) References Cited

U.S. PATENT DOCUMENTS

| | | | |
|---|---|---|---|
| 7,701,686 B2 * | 4/2010 | Kato et al. | 361/93.1 |
| 7,863,833 B2 * | 1/2011 | Tamegai et al. | 315/307 |
| 8,315,028 B2 * | 11/2012 | Ohshima | 361/94 |
| 2003/0048645 A1 | 3/2003 | Hosotani et al. | |
| 2003/0193320 A1 | 10/2003 | Sugimura | |
| 2006/0209581 A1 | 9/2006 | Choi et al. | |
| 2010/0073041 A1 | 3/2010 | Djenguerian et al. | |
| 2010/0321039 A1 | 12/2010 | Matthews et al. | |
| 2011/0103101 A1 | 5/2011 | Hiasa | |
| 2012/0039097 A1 | 2/2012 | Djenguerian et al. | |
| 2012/0049823 A1 | 3/2012 | Chen | |
| 2012/0155129 A1 | 6/2012 | Djenguerian et al. | |
| 2014/0022825 A1 | 1/2014 | Djenguerian et al. | |

FOREIGN PATENT DOCUMENTS

| | | |
|---|---|---|
| JP | 61-501305 A | 6/1986 |
| JP | 10-243650 A | 9/1998 |
| JP | 11-055946 A | 2/1999 |
| JP | 11-234892 A | 8/1999 |
| JP | 2002-051539 A | 2/2002 |
| JP | 2003-088117 A | 3/2003 |
| JP | 3693625 B2 | 9/2005 |
| JP | 2007-028893 A | 2/2007 |
| JP | 2007-073954 A | 3/2007 |
| JP | 2007-159316 A | 6/2007 |
| JP | 2007-209054 A | 8/2007 |
| JP | 2008-533972 A | 8/2008 |
| JP | 2008-206271 A | 9/2008 |
| JP | 2008-259415 A | 10/2008 |
| JP | 2010-075044 A | 4/2010 |
| JP | 2010-148162 A | 7/2010 |
| WO | 2010/104172 A1 | 9/2010 |

OTHER PUBLICATIONS

Official Communication issued in International Patent Application No. PCT/JP2011/057093, mailed on Jun. 28, 2011.

* cited by examiner

SWITCHING CONTROL CIRCUIT AND SWITCHING POWER SUPPLY APPARATUS

BACKGROUND OF THE INVENTION

1. Field of the Invention

The present invention relates to a switching control circuit preferably in the form of an IC and preferably for use in a switching power supply apparatus, and a switching power supply apparatus including the switching control circuit.

2. Description of the Related Art

In switching power supply apparatuses, a switching control IC includes a circuit for providing various functions such as an output control operation, a startup operation, an overcurrent protection operation, an overvoltage protection operation, a standby operation, and a power factor improvement operation. With the increase in the number of functions, the functionality of the switching control IC is increased.

In order to set the functions of a switching control IC so that they meet application operational specifications, a plurality of terminals used to interface with external circuits are needed for the respective functions. Accordingly, the increase in the number of functions increases the number of terminals. The increase in the number of terminals results in an increase in the package size of the switching control IC. This leads to an increase in the unit cost of the IC.

In a case where the number of terminals of a switching control IC is limited, the number of available functions is also limited. It is therefore necessary to prepare various ICs corresponding to specific functions and selectively use the ICs in accordance with specifications and application. In this case, the variety of ICs is increased. Not only an IC manufacturing process but also IC management becomes complicated. As a result, the unit cost of ICs is increased.

In general, ICs inevitably increase in size to meet the increasing demand for multifunctionality. However, the number of functions required for small-sized switching control circuits have recently been increased. Under the present conditions, the mass production of a small variety of ICs is an effective way to reduce the unit cost of semiconductors such as ICs. In addition, the reduction in the number of terminals of an IC, which leads to the reduction in the size of an IC package, can reduce the unit cost of the IC.

Japanese Unexamined Patent Application Publication No. 2007-73954 discloses a technology for reducing the number of terminals of a switching control IC.

FIG. 1 is a circuit diagram of a switching power supply apparatus disclosed in Japanese Unexamined Patent Application Publication No. 2007-73954. Referring to FIG. 1, a switching power supply apparatus 101 includes a transformer 105 having a primary winding 127 and a secondary winding 129, a rectifying and smoothing circuit including a diode 117 and a capacitor 119, a feedback circuit including a Zener diode 121, a photocoupler 113, and a resistor 123, and an integrated circuit 103.

The integrated circuit 103 is connected to the primary winding 127. The integrated circuit 103 is a switching regulator IC including an internal switch coupled between a drain (D) terminal and a source (S) terminal of the integrated circuit 103.

During operation, the internal switch in the integrated circuit 103 adjusts energy transmission from an input 107 to an output 109 through the transformer 105. A feedback signal is input from the feedback circuit to the integrated circuit 103.

A multifunctional capacitor 111 is connected to a bypass terminal BP of the integrated circuit 103. The multifunctional capacitor 111 is used to provide a power supply decoupling function for the integrated circuit 103 during normal operation. The internal circuit in the integrated circuit 103 receives power or a bias current from the multifunctional capacitor 111 and operates during normal operation while adjusting the output 109.

The multifunctional capacitor 111 is used to select a parameter and/or a mode of the integrated circuit 103 during an initialization period of the integrated circuit 103. During the initialization period, the parameter and/or the mode of the integrated circuit 103 is selected.

As described previously, the functions of a switching power supply apparatus include an overcurrent protection function. Methods of implementing the overcurrent protection function include a method of limiting the maximum ON pulse width of a switching element and a method of limiting a peak current. In these methods, a unit for setting a limit value is needed.

However, in a case where switching control ICs for the overcurrent protection methods are independently designed and manufactured, the variety of switching control ICs is increased. Not only an IC manufacturing process but also an IC management becomes complicated. As a result, the unit cost of ICs is increased. In a case where switching control ICs individually have the overcurrent protection function, a terminal for the selection of the overcurrent protection function is needed in each of the switching control ICs. The number of terminals of the switching control IC is increased. This inhibits the miniaturization of the switching control IC and increases the cost of the switching control IC. That is, the size and unit cost of the switching control IC are increased.

SUMMARY OF THE INVENTION

Preferred embodiments of the present invention provide a small-sized low-cost switching control circuit having a small number of terminals and an overcurrent protection function and a switching power supply apparatus including the switching control circuit.

A switching control circuit according to a preferred embodiment of the present invention includes a plurality of external terminals and includes a semiconductor integrated circuit that is disposed in a power conversion circuit in a switching power supply apparatus and is configured to control a switching element. The switching control circuit includes a feedback terminal into which a feedback signal used to detect and control an output voltage obtained from an operation of the switching control circuit is input, an output terminal from which a control signal used to control the switching element is output, a current detection terminal into which a current detection signal from a current detection circuit configured to detect a current flowing through the power conversion circuit as a result of the operation of the switching control circuit is input, a soft start terminal into which a signal used to set control processing for the switching element in a soft start period in a startup period from a start of the operation of the power conversion circuit to a normal operation of the power conversion circuit is input, a soft start controller arranged and programmed to control an ON duration of the switching element in the startup period on the basis of the signal input into the soft start terminal, a first overcurrent protection portion arranged and programmed to, when detecting a state in which a current flowing through the power conversion circuit exceeds a first predetermined current value on the basis of the current detection signal, control an output voltage of the output terminal and stop a switching operation of the power conversion circuit, a second overcurrent protection section arranged and programmed to, when detecting a state in which a current flowing through the power conversion circuit exceeds a second predetermined current value on the basis of the current detection signal input into the current detection terminal, control an output voltage of the output terminal, quickly turn off the switching element, and limit the current flowing through the power conversion circuit, and a first overcurrent protection selecting device arranged to detect a voltage induced by an external circuit that is connected to the soft start terminal and includes at least one of a resistance element and a semiconductor element as a determination target signal and select one of setting and non-setting of the first overcurrent protection section in accordance with the determination target signal in a predetermined detection period in which the determination target signal is detected.

For example, when the current detection circuit detects the state in which the current exceeds the first predetermined current value over a predetermined period or a predetermined number of times, the first overcurrent protection section preferably controls the output voltage of the output terminal, keeps the switching element in an OFF state, and stops the switching operation.

For example, when the current detection circuit detects the state in which the current exceeds the first predetermined current value over a predetermined period or a predetermined number of times and a feedback signal indicating that the output voltage is controlled and an overcurrent state is not occurring is input into the feedback terminal, the first overcurrent protection section preferably controls the output voltage of the output terminal, keeps the switching element in an OFF state, and stops the switching operation.

For example, when the current detection circuit detects the second predetermined current value is larger than the first predetermined current value, the second overcurrent protection section preferably quickly turns off the switching element.

For example, the first overcurrent protection section preferably limits the maximum value of power output from the power conversion circuit, and the second overcurrent protection section preferably limits the maximum value of a current flowing through the switching element.

For example, the first overcurrent protection selection device preferably selects one of setting and non-setting of the first overcurrent protection section by comparing the voltage corresponding to the determination target signal with a predetermined voltage.

For example, the external circuit preferably includes a resistor, and the determination target signal is a signal corresponding to a voltage induced by the resistor.

For example, the external circuit preferably includes a Zener diode, and the determination target signal is a signal corresponding to a voltage induced by the Zener diode.

For example, the detection period preferably starts after the soft start period has elapsed.

For example, the detection period preferably starts after a power supply voltage equal to or higher than a predetermined voltage has been input into the switching control circuit and the semiconductor integrated circuit has started to operate.

For example, the detection period preferably ends after a power supply voltage equal to or higher than a predetermined voltage has been input into the switching control circuit and the output terminal has started to output a control signal used to control the switching element.

For example, the switching control circuit preferably further includes a constant-current circuit configured to supply a constant current to the soft start terminal.

For example, the switching control circuit preferably further includes maximum ON time limiting device configured to set a limit value of an ON time of the switching element during a normal operation in accordance with the determination target signal corresponding to a voltage lower than a voltage at which the first overcurrent protection section operates.

For example, the maximum ON time limiting device preferably detects a voltage induced by the resistor included in the external circuit and sets a limit value of the ON time in accordance with the induced voltage.

For example, the external circuit preferably includes an upper limit setting circuit configured to determine an upper limit of a voltage at the soft start terminal.

For example, the upper limit setting circuit preferably includes a Zener diode.

A switching power supply apparatus according to another preferred embodiment of the present invention includes the switching control circuit according to a preferred embodiment of the present invention described above, preferably located at the power conversion circuit.

According to various preferred embodiments of the present invention, since one of a plurality of overcurrent protection methods can be appropriately selected without dedicated terminals, it is possible to provide a switching control circuit having an overcurrent protection function without increasing the number of terminals of a switching control IC.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

Figure 1:
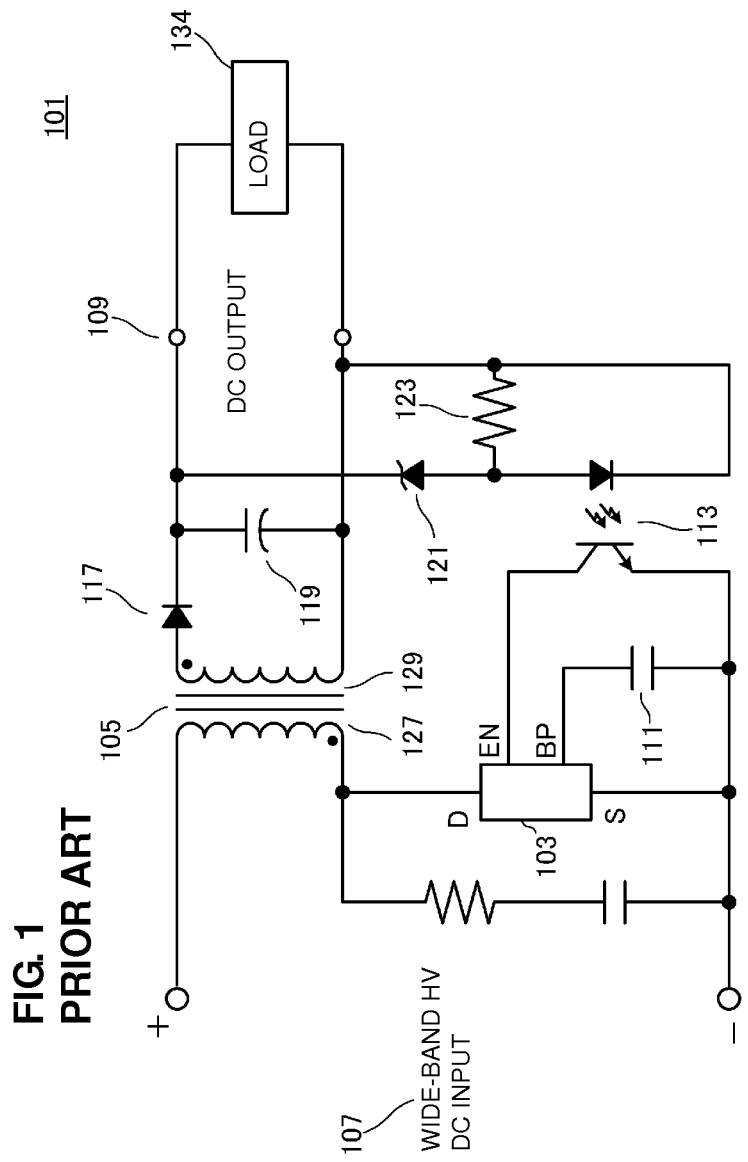
FIG. 1 is a circuit diagram of a switching power supply apparatus disclosed in Japanese Unexamined Patent Application Publication No. 2007-73954.
Figure 2:
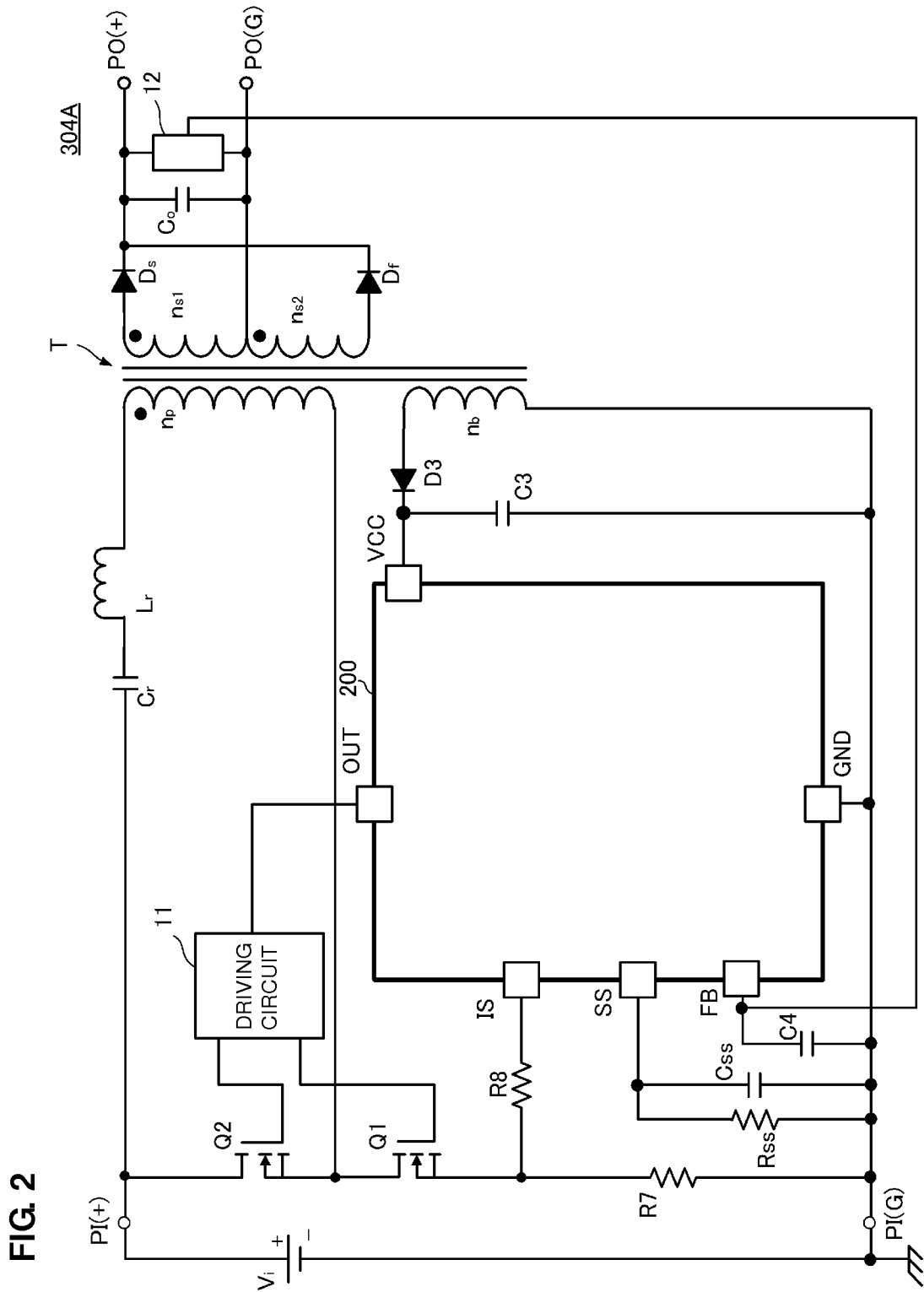
FIG. 2 is a circuit diagram of a switching power supply apparatus 304A according to a first preferred embodiment of the present invention.
Figure 3:
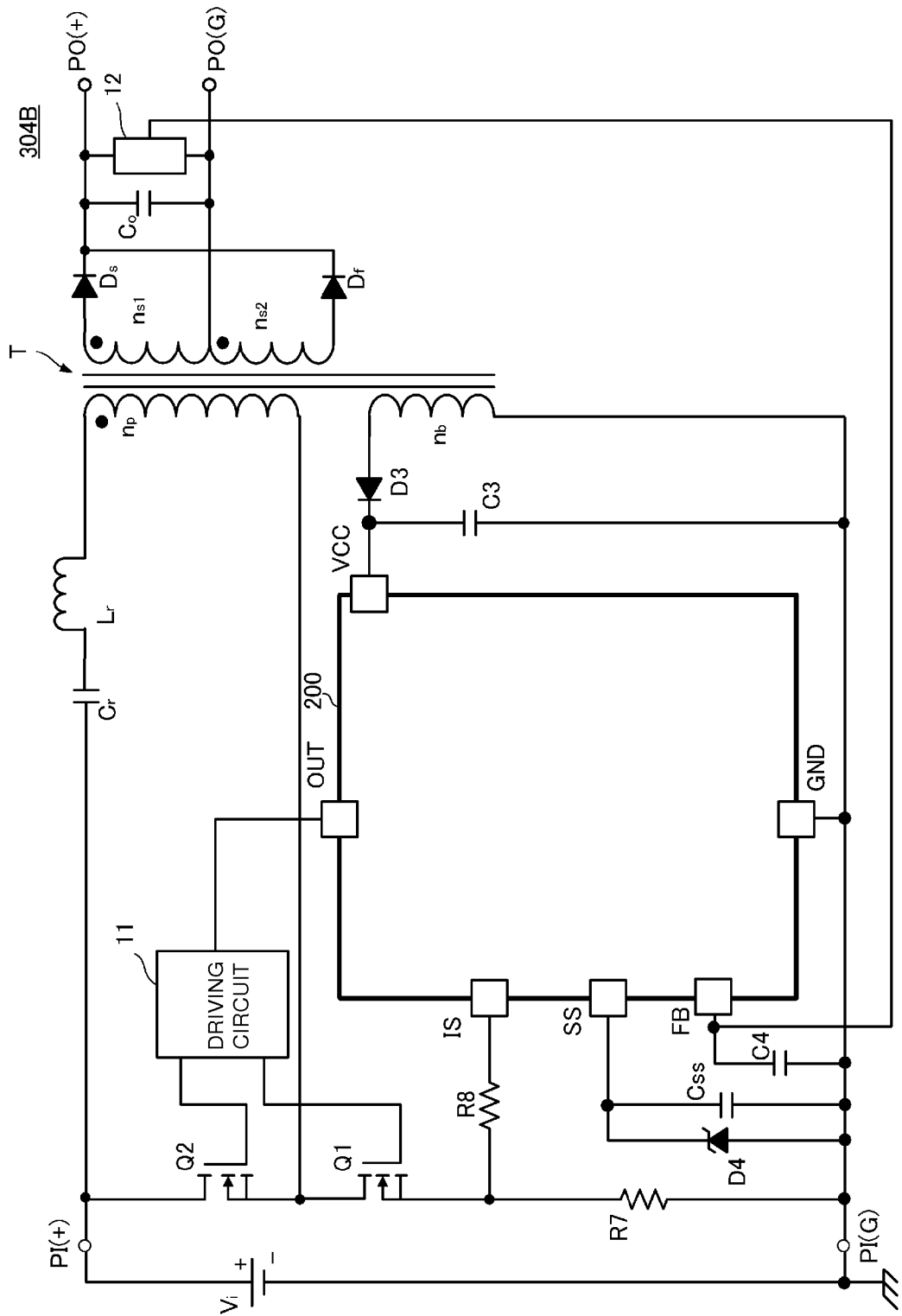
FIG. 3 is a circuit diagram of another switching power supply apparatus 304B according to the first preferred embodiment of the present invention.

FIGS. 2 and 3 are circuit diagrams of switching power supply apparatuses 304A and 304B according to the first preferred embodiment of the present invention, respectively. Each of the switching power supply apparatuses 304A and 304B includes a switching control IC 200 corresponding to a switching control circuit according to a preferred embodiment of the present invention. Different circuits are connected to soft start terminals SS of the switching control ICs 200 illustrated in FIGS. 2 and 3.

A voltage of a DC input power supply Vi is input between an input terminal PI(+) and an input terminal PI(G) of each of the switching power supply apparatuses 304A and 304B. A predetermined DC voltage is output to a load connected between an output terminal PO(+) and an output terminal PO(G) of each of the switching power supply apparatuses 304A and 304B.

A first series circuit including a capacitor Cr, an inductor Lr, a primary winding np of a transformer T, a first switching element Q1, and a current detection resistor R7 which are connected in series is provided between the input terminals PI(+) and PI(G). The first switching element Q1 preferably is an FET, for example. A drain terminal and a source terminal of the first switching element Q1 are connected to the primary winding np of the transformer T and the current detection resistor R7, respectively.

A second switching element Q2 preferably is an FET, for example. A drain terminal and a source terminal of the second switching element Q2 are connected to the input terminal Vin(+) and the drain terminal of the first switching element Q1, respectively.

At secondary windings ns1 and ns2 of the transformer T, a first rectifying and smoothing circuit including diodes Ds and Df and a capacitor Co is provided. The first rectifying and smoothing circuit performs full-wave rectification on an AC voltage output from the secondary windings ns1 and ns2, smoothes the resulting voltage, and outputs the smoothed voltage to the output terminals PO(+) and PO(G).

A rectifying and smoothing circuit including a diode D3 and a capacitor C3 is connected to a drive winding nb of the transformer T. A DC voltage obtained by this rectifying and smoothing circuit is supplied between a GND terminal and a VCC terminal of the switching control IC 200 as a power supply voltage.

In each of the switching power supply apparatuses 304A and 304B, a circuit other than the switching control IC 200 is a power conversion circuit.

The switching control IC 200 outputs a rectangular wave signal from an OUT terminal thereof to a driving circuit 11. The driving circuit 11 performs control processing so that the first switching element Q1 and the second switching element Q2 are alternately turned on and off. A dead time period is set so as to prevent the switching elements Q1 and Q2 from being turned on at the same time.

A resistor R8 is connected to a current detection terminal IS of the switching control IC 200 so that a dropped voltage of the current detection resistor R7 is input into the current detection terminal IS.

A feedback circuit 12 is provided between the output terminals PO(+) and PO(G) and the switching control IC 200. The feedback circuit 12 generates a feedback signal by comparing a voltage division value of a voltage between the output terminals PO(+) and the PO(G) with a reference voltage and inputs a feedback voltage into a feedback terminal FB of the switching control IC 200 in an insulated state.

An external circuit including a resistor Rss and a capacitor Css is connected between a soft start terminal SS and a ground GND.

A capacitor C4 is connected between the feedback terminal FB and the ground terminal.

The feedback circuit 12 operates such that a voltage at the feedback terminal FB decreases as a voltage output to the output terminals PO(+) and PO(G) is increased to a voltage higher than a preset voltage.

The switching control IC 200 outputs a rectangular wave signal from the output terminal OUT and turns on/off the first switching element Q1 and the second switching element Q2 via the driving circuit 11 at a predetermined switching frequency. As a result, each of the switching power supply apparatuses 304A and 304B operates as a current resonant converter.

During normal operation that is not an overcurrent operation, the switching control IC 200 detects an output voltage with a signal input into the feedback terminal FB, and controls the frequency of a rectangular wave signal to be output to the output terminal OUT so that the detected output voltage becomes constant. As a result, the output voltage of each of the switching power supply apparatuses 304A and 304B is stabilized.

The original function of the soft start terminal SS of the switching control IC 200 is to cause an element to perform a soft start operation. The soft start involves control processing for gradually increasing the ON duration of an output pulse used to drive the switching elements Q1 and Q2 during startup of the converter. The length of a soft start period is set in accordance with the time constant of the external circuit connected to the soft start terminal SS. More specifically, a constant current circuit is connected to the soft start terminal SS, and a charging time constant for the external capacitor Css is determined in accordance with the value of a constant current and the capacitance of the capacitor Css.

The switching control IC 200 preferably is programmed to perform the following functions.

(1) A first overcurrent protection function of setting an output terminal voltage used to control a switching element to a low level, stopping a switching operation, and limiting output power.

(2) A second overcurrent protection function of quickly turning off the switching element Q1 and limiting the peak value of a current flowing.

(3) A function of setting the maximum ON pulse width with the soft start terminal SS.

(4) A function of detecting an overcurrent method selection signal with the soft start terminal SS and selecting the setting or non-setting of the first overcurrent protection function after the soft start period has elapsed in synchronization with a soft start circuit.

(5) A third overcurrent protection function of disposing a circuit for limiting the maximum ON pulse width with the soft start terminal SS in a soft start circuit and limiting the maximum ON pulse width with the circuit.

Figure 4:
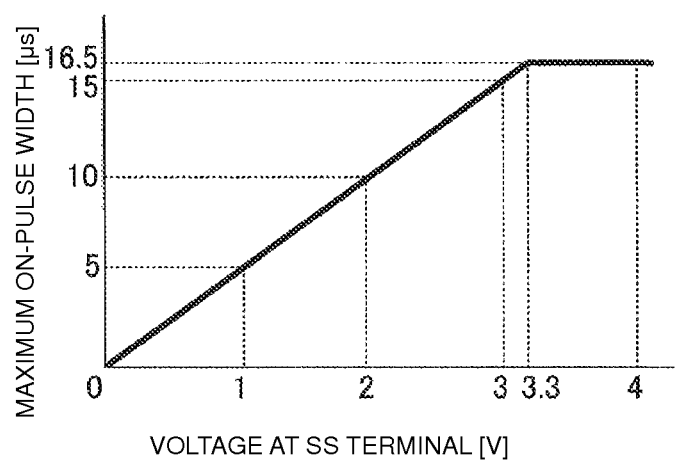
FIG. 4 is a diagram illustrating the relationship between a voltage at a soft start terminal SS and the maximum ON pulse width.

FIG. 4 is a diagram illustrating the relationship between a voltage at the soft start terminal SS and the maximum ON pulse width. In a range of voltages at the soft start terminal SS from 0 V to about 3.3 V, the maximum ON pulse width is proportional to the voltage at the soft start terminal SS and ranges from 0 μs to about 16.5 μs, for example. In a range of voltages at the soft start terminal SS above about 3.3 V, the maximum ON pulse width is maintained at about 16.5 μs, for example.

Figure 5:
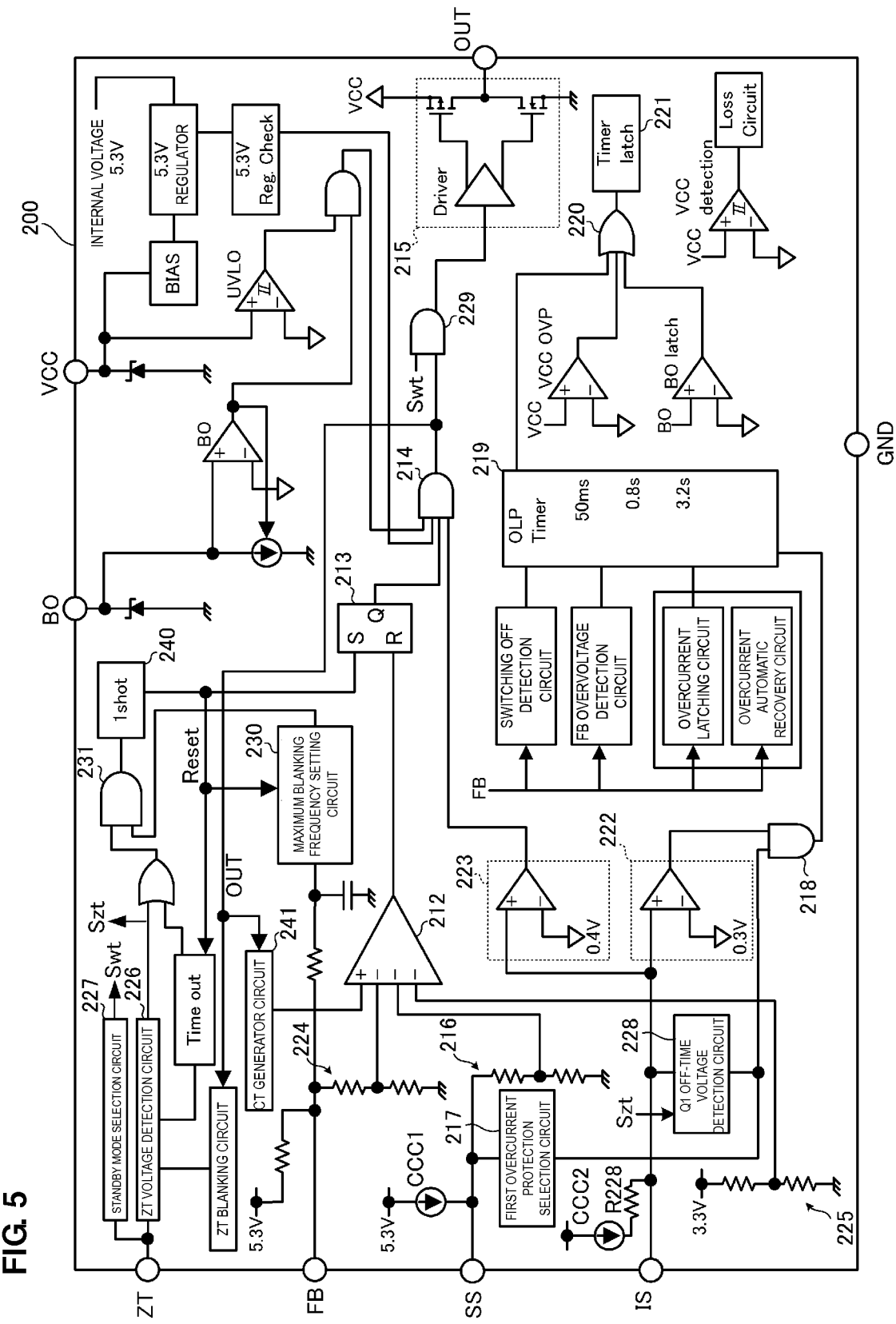
FIG. 5 is a block diagram illustrating the internal configuration of a switching control IC 200.

FIG. 5 is a block diagram illustrating the internal configuration of the switching control IC 200. Referring to FIG. 5, when a one-shot circuit 240 sets a flip-flop 213, a Q output signal from the flip-flop 213 is output to the OUT terminal via an AND gate 214 and a drive 215 as a high-level gate control voltage.

A CT generator circuit 241 outputs a lamp waveform voltage after the output of the AND gate 214 has become a high level. When the voltage output from the CT generator circuit 241 exceeds a lowest one of voltages input into three negative (−) terminals of a comparator 212, the comparator 212 resets the flip-flop 213. As a result, the voltage at the OUT terminal is returned to a low level.

The above-described operation preferably is repeatedly performed, so that the waveform of the voltage output from the OUT terminal is changed to a rectangular waveform.

A constant-current circuit CCC1 is connected to the soft start terminal SS. As illustrated in FIG. 2, since the capacitor Css is connected to the soft start terminal SS, the voltage at the soft start terminal SS becomes equal to a charging voltage of the capacitor Css. With the increase in the voltage at the soft start terminal SS, intervals at which the output of the comparator 212 is reversed are extended and the ON time of the switching element is gradually increased. Thus, the soft start operation is performed. Since the constant-current circuit CCC1 is disposed in the switching control IC as described previously, the need to dispose a constant-current circuit outside the switching control IC and connect the constant-current circuit to the switching control IC is eliminated. The reduction in the number of components and miniaturization can be therefore achieved.

As illustrated in FIG. 2, in a case where the resistor Rss is externally connected to the soft start terminal SS, the voltage at the soft start terminal SS is determined in accordance with the current value of the constant-current circuit CCC1 and the resistance value of the resistor Rss in a state in which the capacitor Css is fully charged.

During the soft start period, the voltage output from a resistance dividing circuit 216 is the lowest among voltages input into the three negative (−) terminals of the comparator 212. Accordingly, the ON duration of a switching element is gradually increased with the increase in the voltage at the soft start terminal SS, so that the soft start operation is performed.

After the soft start operation has been completed, the voltage output from a resistance dividing circuit 224 becomes the lowest among the voltages input into the three negative (−) terminals of the comparator 212. Accordingly, the ON time of the switching element is determined in accordance with a voltage applied to the feedback terminal FB. When the voltage at the feedback terminal FB exceeds a voltage applied to the SS terminal which is determined in accordance with the resistance value of the external resistor Rss (a voltage equal to or less than about 3.3 V, for example, at a resistance dividing circuit 225), the voltage applied to the SS terminal becomes the lowest among the voltages input into the three negative (−) terminals of the comparator 212. Accordingly, control processing is performed so that the ON time is not further increased, and the maximum ON time or the maximum duty ratio is set.

The third overcurrent protection function of limiting the maximum ON pulse width is performed.

When a threshold value is, for example, about 4 V and the voltage at the soft start terminal SS exceeds about 4 V, a first overcurrent protection selection circuit 217 activates an AND gate 218 to enable an output of a first overcurrent detection circuit 222. When the voltage at the IS terminal exceeds about 0.3 V, the first overcurrent detection circuit 222 changes the output to a high level to start a timer operation of an overcurrent protection timer 219. When the output of the first overcurrent detection circuit 222 becomes a high level and the high-level state continues for about 50 ms, for example, the overcurrent protection timer 219 causes a timer latch 221 to perform latching via an OR gate 220. The timer latch 221 stops the switching of the switching element for about 3.2 s, for example. Thus, the first overcurrent protection function is performed.

When latching is performed with the first overcurrent protection function, a feedback voltage, which is a feedback signal indicating that an overcurrent state does not occur, is input into the feedback terminal FB. Accordingly, when the voltage at the IS terminal exceeds about 0.3 V, for example, latching is performed not by the function of the feedback terminal FB but by the first overcurrent protection function.

In the first overcurrent protection function, as described previously, latching is performed when the voltage exceeding about 0.3 V lasts for about 50 ms at the IS terminal, for example. However, latching may be alternatively performed when the number of times that the voltage at the IS terminal exceeds about 0.3 V reaches a predetermined value, for example.

In a case where the voltage at the soft start terminal SS is below about 4 V after the soft start operation has been completed, the first overcurrent protection selection circuit 217 keeps the output at a low level to set the output of the AND gate 218 to a low level and disable the output of the first overcurrent detection circuit 222. That is, the first overcurrent protection is deselected (canceled).

When the resistance value of the resistor Rss illustrated in FIG. 2, which is connected to the soft start terminal SS, is determined so that the voltage at the soft start terminal SS reaches about 4 V after the soft start operation has been completed, the first overcurrent protection is set. When the resistance value of the resistor Rss is determined so that the voltage at the soft start terminal SS does not reach about 4 V after the soft start operation has been completed, the first overcurrent protection is not set. As illustrated in FIG. 3, in a case where a Zener diode D4 whose Zener voltage is less than about 4 V is connected to the soft start terminal SS, the voltage at the soft start terminal SS does not reach about 4 V after the soft start operation has been completed and the first overcurrent protection is not set.

Thus, one of the setting and non-setting of the first overcurrent protection function is preferably selected in accordance with the resistance value of the external resistor Rss after the soft start period has been completed.

When the voltage at the IS terminal exceeds about 0.4 V, that is, the IS terminal is brought into a large overcurrent state, an output of a second overcurrent detection circuit 223 becomes a high level. The switching element Q1 is quickly turned off, and the peak value of a current flowing is limited. A circuit element is therefore prevented from being broken due to an unlimited current peak value. That is, the second overcurrent protection function is performed.

There is no need to separately design and manufacture switching control ICs having various overcurrent protection functions. As a result, the amount of inventory of different components can be reduced, the standardization of components can be promoted, and the cost can be reduced.

Furthermore, since there is no need to provide and use a dedicated IC terminal for performing the setting/non-setting of an overcurrent protection function, it is possible to reduce the size of an IC. Effective use of the terminals of the IC makes it possible to increase the functionality of the IC.

Still furthermore, simply by connecting a Zener diode to the terminal of the IC as a peripheral circuit, it is possible to perform the setting/non-setting of an overcurrent protection function without causing any adverse effects on the normal operation of the IC.

In the above-described example, an external circuit connected to the soft start terminal SS is a voltage clamp circuit preferably including a Zener diode, for example. However, instead of the Zener diode, a resistor, a transistor, or an operational amplifier may be used as the external circuit.

Second Preferred Embodiment

Figure 6:
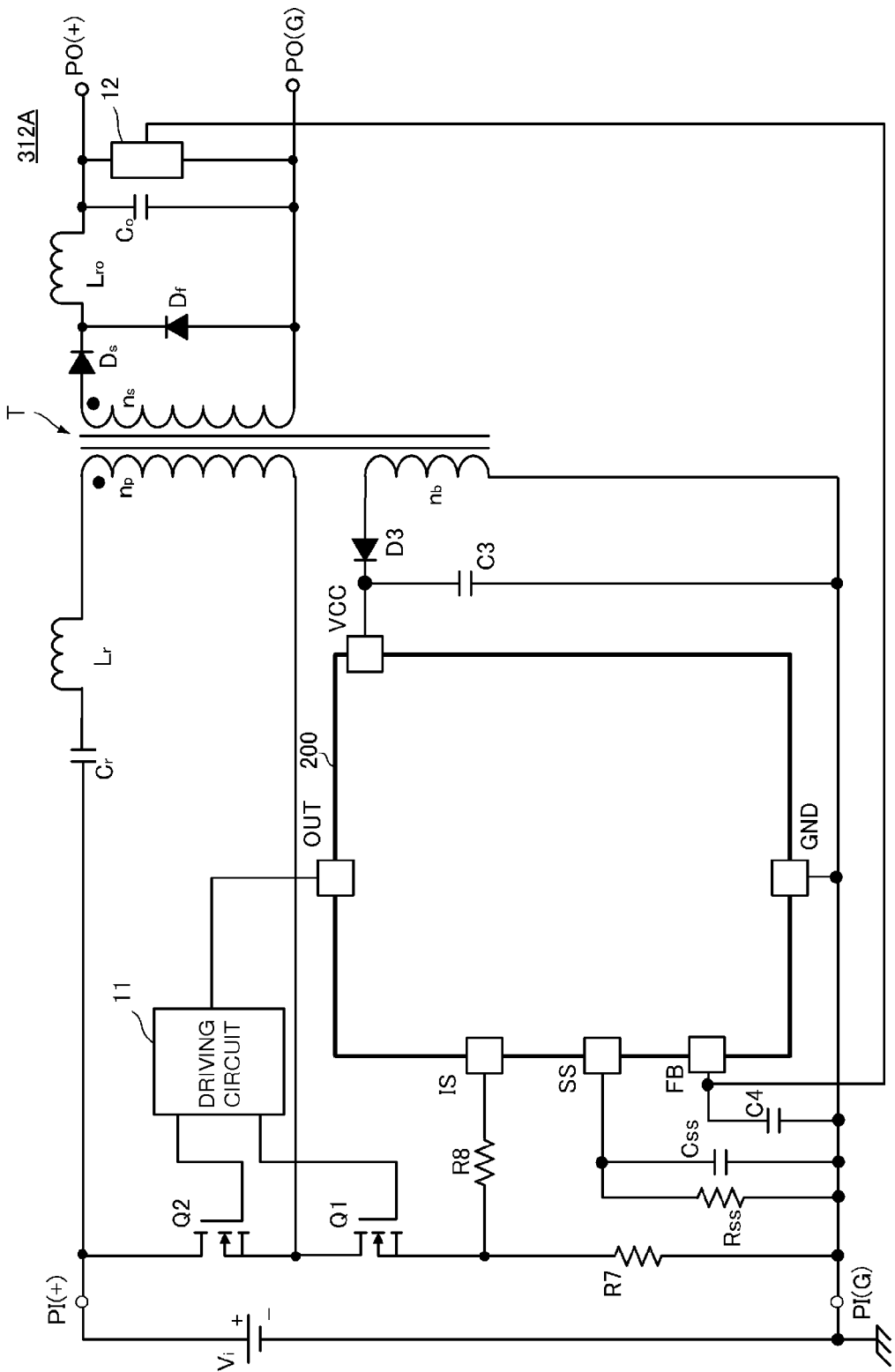
FIG. 6 is a circuit diagram of a switching power supply apparatus 312A according to a second preferred embodiment of the present invention.
Figure 7:
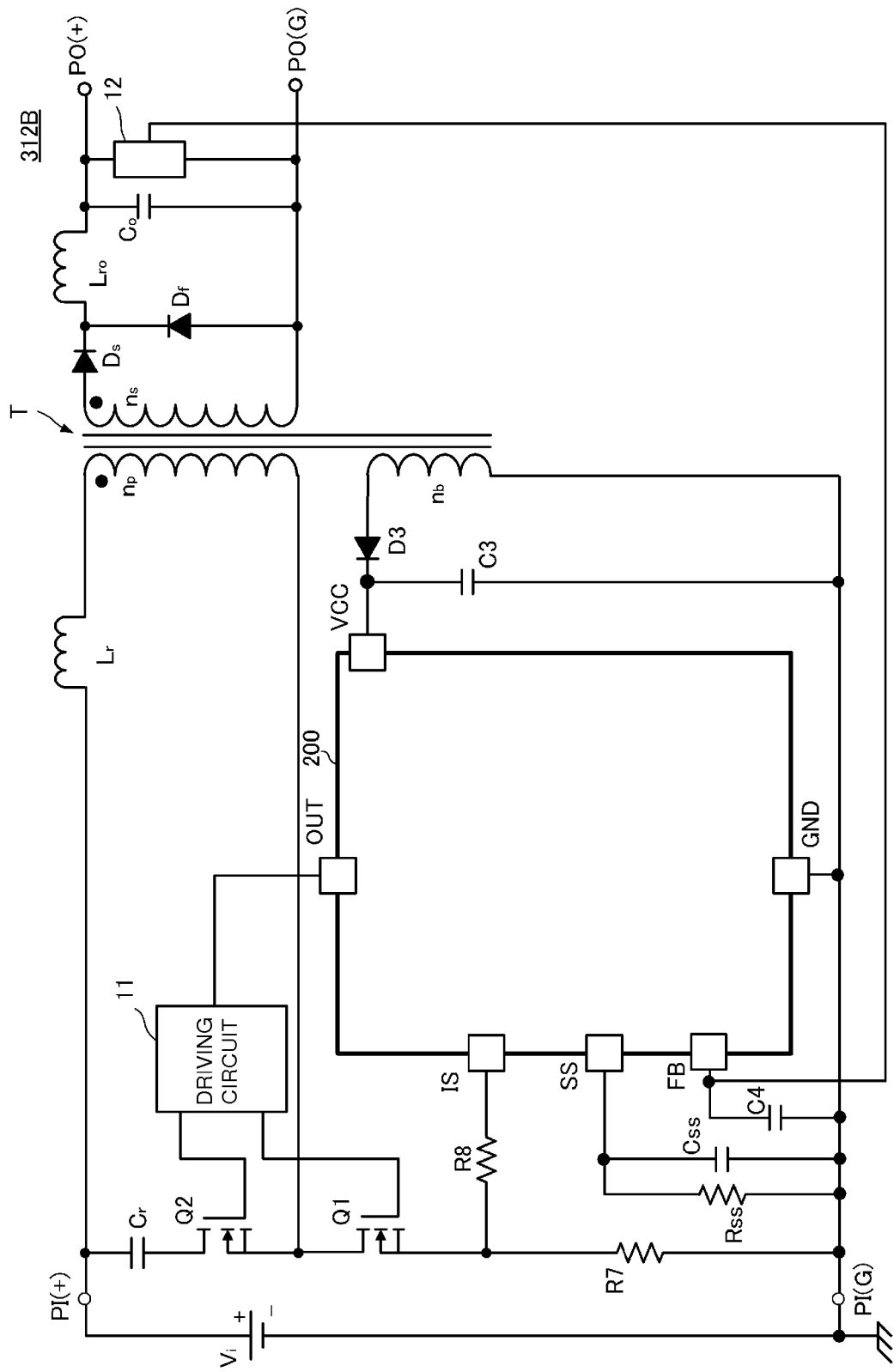
FIG. 7 is a circuit diagram of another switching power supply apparatus 312B according to the second preferred embodiment of the present invention.

FIGS. 6 and 7 are circuit diagrams of switching power supply apparatuses 312A and 312B according to the second preferred embodiment of the present invention, respectively. Each of the switching power supply apparatuses 312A and 312B includes the switching control IC 200 corresponding to a switching control circuit according to a preferred embodiment of the present invention. In both the switching power supply apparatuses 312A and 312B, the secondary side of the transformer T preferably is of a forward type, for example. The difference between FIGS. 6 and 7 is the connection position of the resonant capacitor Cr on the primary side.

Thus, a rectifying and smoothing circuit including the diodes Ds and Df, an inductor Lro, and the capacitor Co may be disposed on the secondary side of the transformer T so that the secondary side of the transformer T is of a forward type, for example.

As illustrated in FIG. 7, the primary-side resonant capacitor Cr may be connected in series to the drain of the switching element Q2, because the primary-side resonant capacitor Cr is connected in series to a closed loop formed when the high-side switching element Q2 is in an ON state even in this arrangement.

The other configuration is preferably the same or substantially the same as that described in the first preferred embodiment, and similar operational effects and advantages can be obtained.

Third Preferred Embodiment

Figure 8:
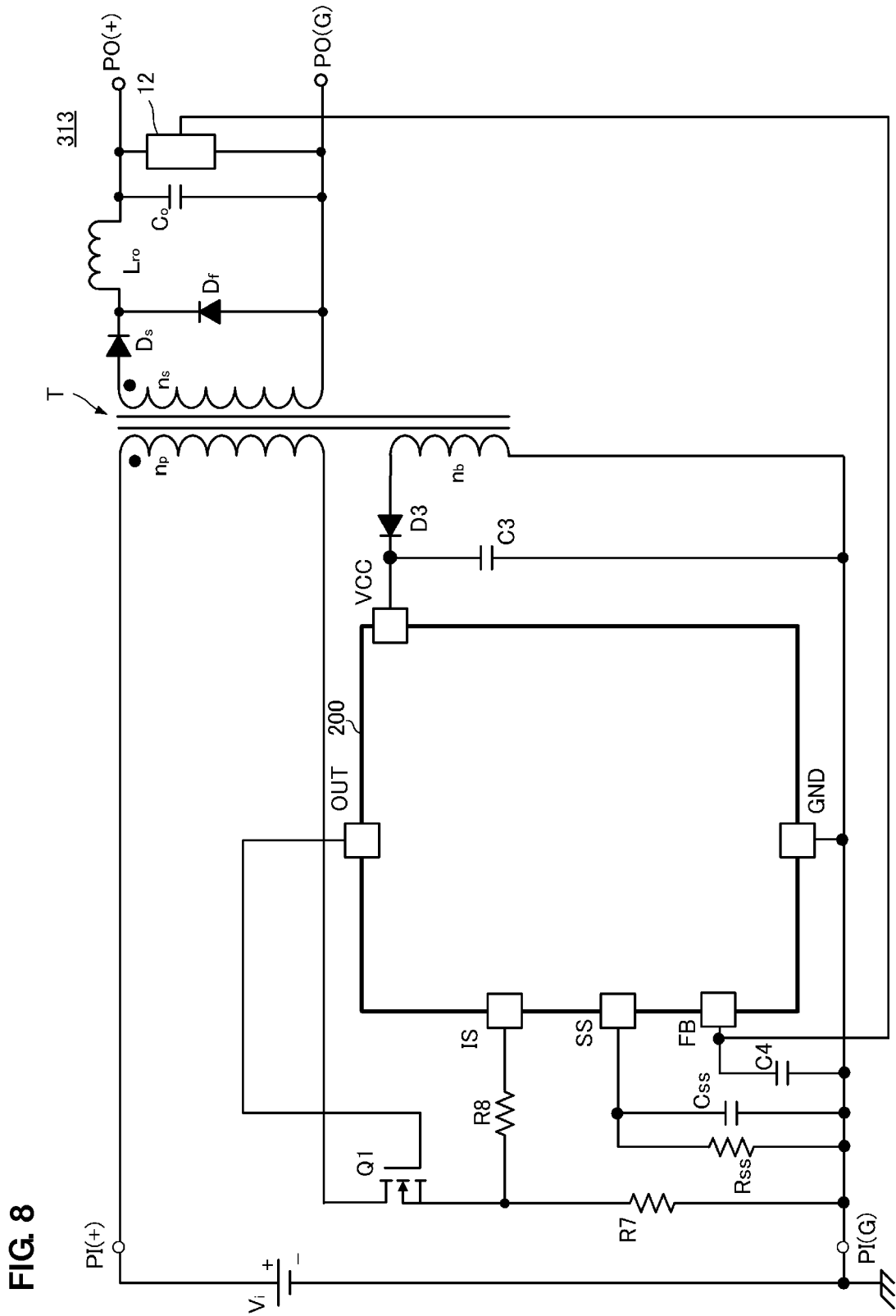
FIG. 8 is a circuit diagram of a switching power supply apparatus 313 according to a third preferred embodiment of the present invention.

FIG. 8 is a circuit diagram of a switching power supply apparatus 313 according to the third preferred embodiment of the present invention. The switching power supply apparatus 313 includes the switching control IC 200 corresponding to a switching control circuit according to a preferred embodiment of the present invention. In the switching power supply apparatus 313, the secondary side of the transformer T preferably is of a forward type, for example.

This switching power supply apparatus differs from the switching power supply apparatus 304A illustrated in FIG. 2 in that the inductor Lr, the capacitor Cr, and the second switching element Q2 are not disposed and a simple forward converter is provided.

A preferred embodiment of the present invention can be similarly applied to such a simple forward converter, and a similar operational effects and advantages can be obtained.

Fourth Preferred Embodiment

Figure 9:
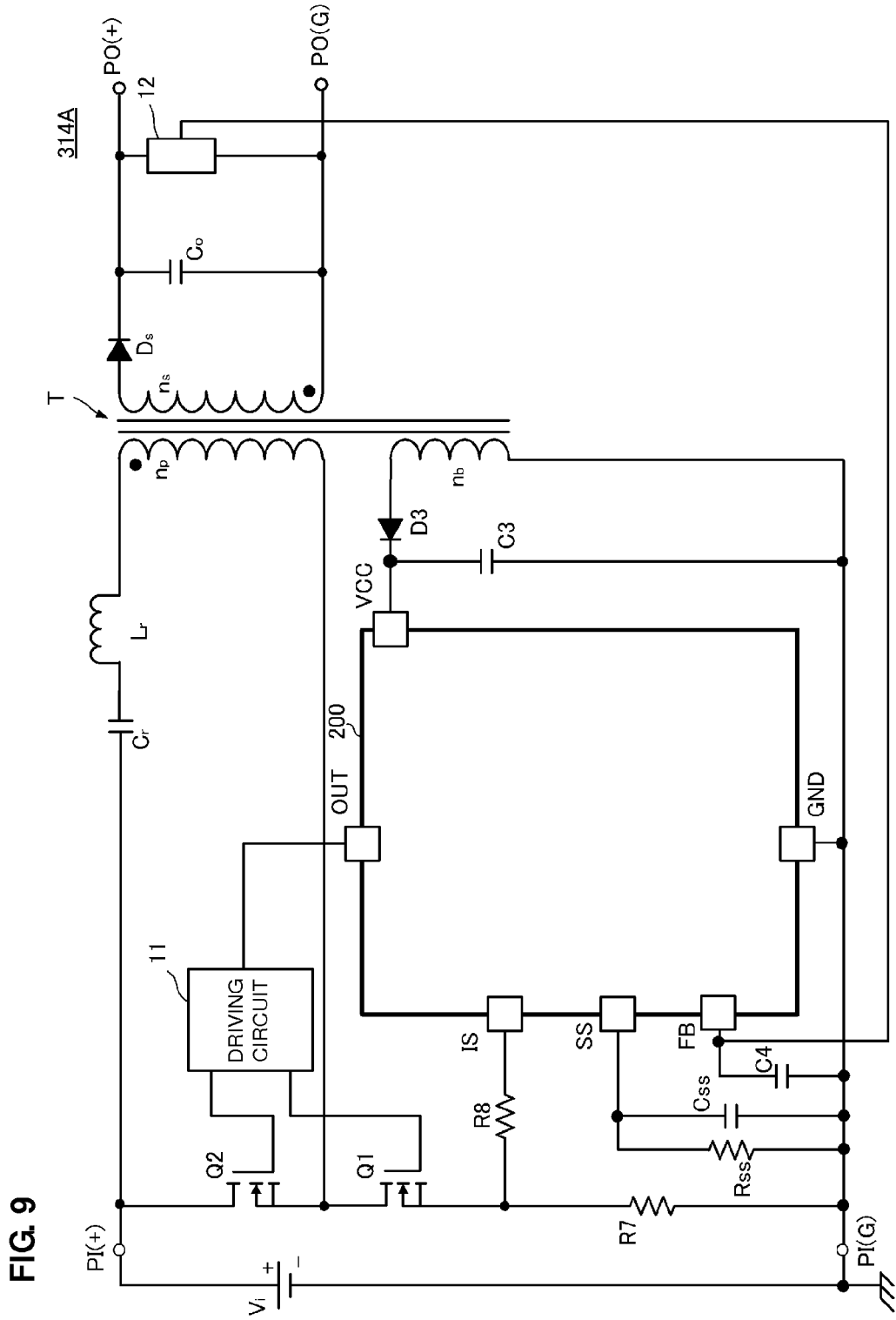
FIG. 9 is a circuit diagram of a switching power supply apparatus 314A according to a fourth preferred embodiment of the present invention.
Figure 10:
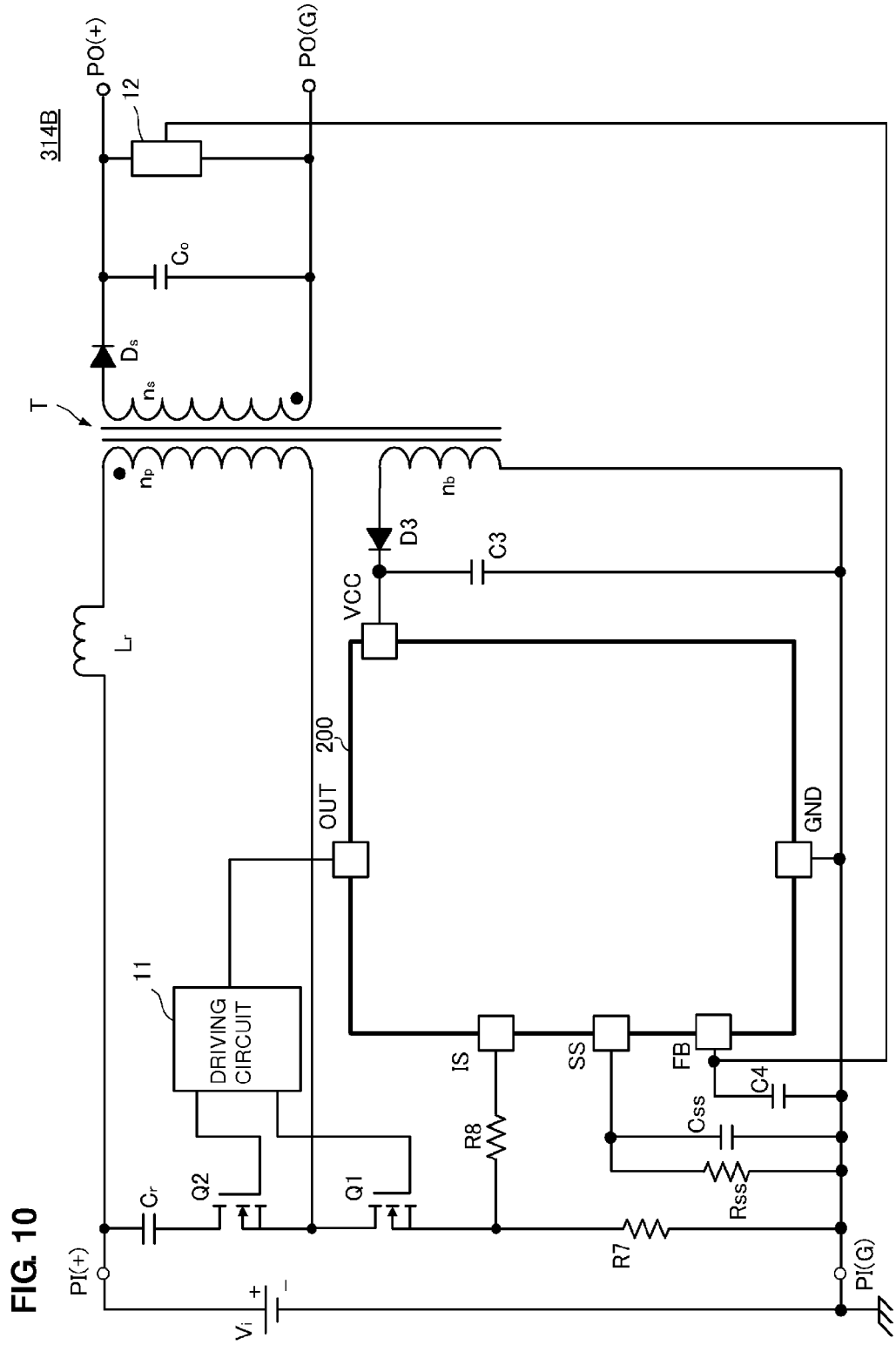
FIG. 10 is a circuit diagram of another switching power supply apparatus 314B according to the fourth preferred embodiment of the present invention.

FIGS. 9 and 10 are circuit diagrams of switching power supply apparatuses 314A and 314B according to the fourth preferred embodiment of the present invention, respectively. Each of the switching power supply apparatuses 314A and 314B includes the switching control IC 200 corresponding to a switching control circuit according to a preferred embodiment of the present invention. In both the switching power supply apparatuses 314A and 314B, the secondary side of the transformer T preferably is of a flyback type, for example. The difference between FIGS. 9 and 10 is the connection position of the resonant capacitor Cr on the primary side.

Thus, a rectifying and smoothing circuit including the diode Ds and the capacitor Co may be disposed on the secondary side of the transformer T so that the secondary side of the transformer T is of a flyback type.

As illustrated in FIG. 10, the primary-side resonant capacitor Cr may be connected in series to the drain of the switching element Q2, because the primary-side resonant capacitor Cr is connected in series to a closed loop formed when the high-side switching element Q2 is in an ON state even in this arrangement.

The other configuration is preferably the same or substantially the same as that described in the first preferred embodiment, and similar operational effects and advantages can be obtained.

Fifth Preferred Embodiment

Figure 11:
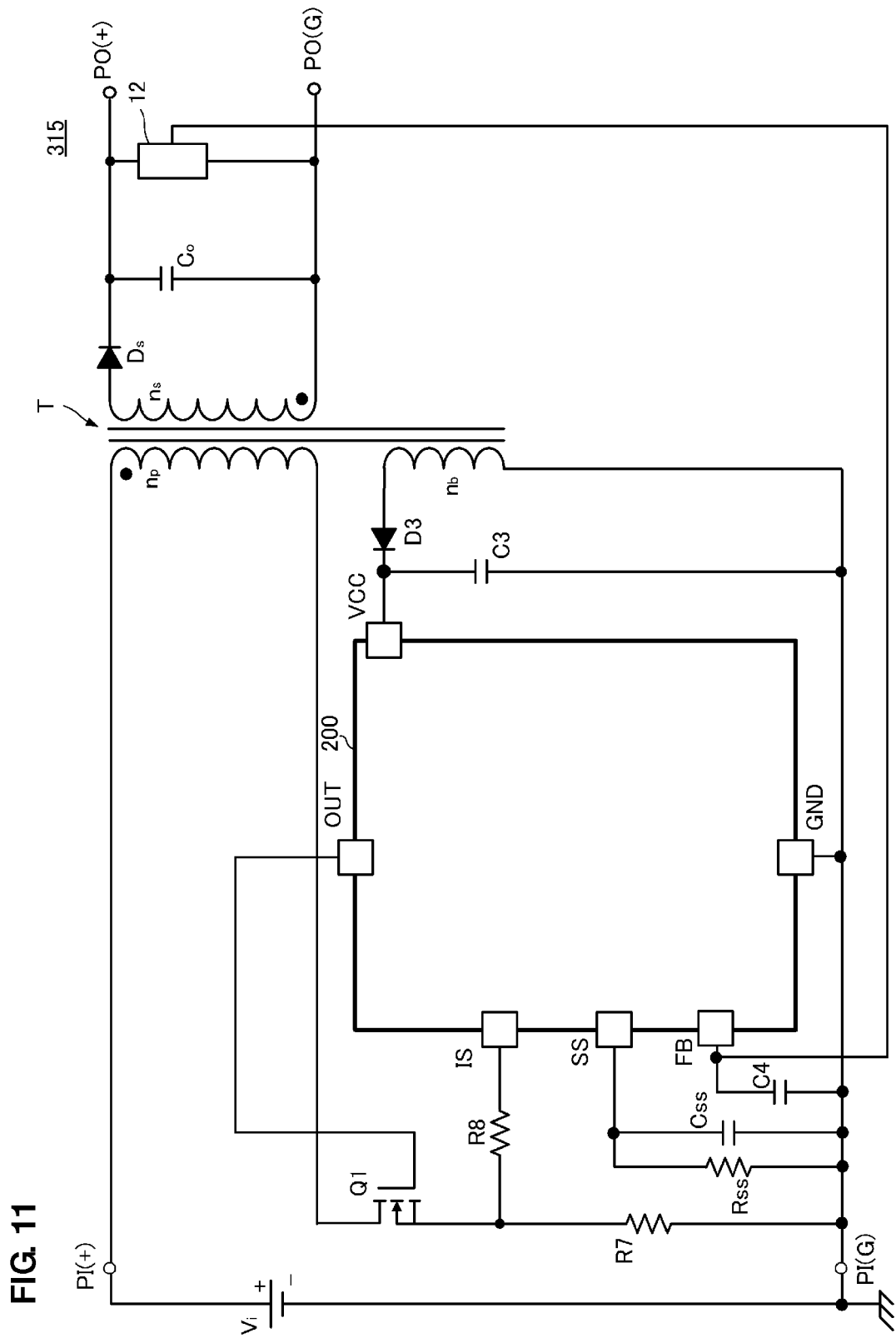
FIG. 11 is a circuit diagram of a switching power supply apparatus 315 according to a fifth preferred embodiment of the present invention.

FIG. 11 is a circuit diagram of a switching power supply apparatus 315 according to the fifth preferred embodiment of the present invention. The switching power supply apparatus 315 includes the switching control IC 200 corresponding to a switching control circuit according to a preferred embodiment of the present invention. In the switching power supply apparatus 315, the secondary side of the transformer T preferably is of a flyback type, for example.

This switching power supply apparatus differs from the switching power supply apparatus 314A illustrated in FIG. 9 in that the inductor Lr, the capacitor Cr, and the second switching element Q2 are not disposed and a simple flyback converter is formed.

A preferred embodiment of the present invention can be similarly applied to such a simple forward converter, and similar operational effects and advantages can be obtained.

Other Preferred Embodiments

In the above-described preferred embodiments, the first overcurrent protection is preferably performed when it is detected that an overcurrent state in which a current flowing through a switching element exceeds a predetermined current value has lasted for a predetermined period. However, the determination of whether the overcurrent state has occurred does not necessarily have to be performed by continuously detecting an overcurrent for a predetermined period, and may be performed by detecting a current value at predetermined time intervals. When the number of times that the overcurrent state has occurred reaches a predetermined number, the first overcurrent protection may be performed, for example.

The converter type of a switching power supply apparatus according to a preferred embodiment of the present invention is not limited to an isolated converter type, and may be a non-isolated converter type, for example. The converter type of a switching power supply apparatus according to a preferred embodiment of the present invention is not limited to a half-bridge converter type, and may be a full-bridge converter type.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A switching control circuit comprising:
   a plurality of external terminals;
   a semiconductor integrated circuit that is disposed in a power conversion circuit in a switching power supply apparatus and is configured to control a switching element;
   a feedback terminal into which a feedback signal used to detect and control an output voltage obtained from an operation of the switching control circuit is input;
   an output terminal from which a control signal used to control the switching element is output;
   a current detection terminal into which a current detection signal from a current detection circuit configured to detect a current flowing through the power conversion circuit as a result of the operation of the switching control circuit is input;
   a soft start terminal into which a signal used to set control processing for the switching element in a soft start period in a startup period from a start of operation of the power conversion circuit to a normal operation of the power conversion circuit is input;
   a soft start controller arranged and programmed to control an ON duration of the switching element in the startup period based on the signal input into the soft start terminal;
   a first overcurrent protection section arranged and programmed to perform a first overcurrent protection function, when detecting a state in which a current flowing through the power conversion circuit exceeds a first predetermined current value based on the current detection signal, to control an output voltage of the output terminal and stop a switching operation of the power conversion circuit;
   a second overcurrent protection section arranged and programmed to perform a second overcurrent protection function, when detecting a state in which a current flowing through the power conversion circuit exceeds a second predetermined current value based on the current detection signal input into the current detection terminal, to control an output voltage of the output terminal, turn off the switching element, and limit the current flowing through the power conversion circuit; and
   a first overcurrent protection selecting device arranged to detect a voltage induced by an external circuit that is connected to the soft start terminal and includes at least one of a resistance element and a semiconductor element, as a determination target signal, and to select one of setting and non-setting of the first overcurrent protection section in accordance with the determination target signal in a predetermined detection period in which the determination target signal is detected;
   the switching control circuit is configured to perform the first overcurrent protection function and the second overcurrent protection function and further to perform a third overcurrent protection function to control an ON pulse width of the switching element via the soft start controller;
   the third overcurrent protection function controls a maximum ON pulse width of the switching element during normal operation via the soft start controller;
   the first, second and third overcurrent protection functions are selectively set via the external circuit; and
   the soft start terminal is a terminal configured to perform a plurality of functions.

2. The switching control circuit according to claim 1, wherein, when the current detection circuit detects that the current exceeds the first predetermined current value over a predetermined period or a predetermined number of times, the first overcurrent protection section controls the output voltage of the output terminal, keeps the switching element in an OFF state, and stops the switching operation.

3. The switching control circuit according to claim 1, wherein, when the current detection circuit detects that the current exceeds the first predetermined current value over a predetermined period or a predetermined number of times and a feedback signal indicating that the output voltage is controlled and an overcurrent state is not occurring is input into the feedback terminal, the first overcurrent protection section controls the output voltage of the output terminal, keeps the switching element in an OFF state, and stops the switching operation.

4. The switching control circuit according to claim 1, when the current detection circuit detects the second predetermined current value is larger than the first predetermined current value, the second overcurrent protection section turns off the switching element.

5. The switching control circuit according to claim 1, wherein the first overcurrent protection section limits a maximum value of power output from the power conversion circuit, and the second overcurrent protection section limits a maximum value of a current flowing through the switching element.

6. The switching control circuit according to claim 1, wherein the first overcurrent protection selecting device selects one of setting and non-setting of the first overcurrent protection section by comparing the voltage corresponding to the determination target signal with a predetermined voltage.

7. The switching control circuit according to claim 1, wherein the external circuit includes a resistor, and the determination target signal is a signal corresponding to a voltage induced by the resistor.

8. The switching control circuit according to claim 1, wherein the external circuit includes a Zener diode, and the determination target signal is a signal corresponding to a voltage induced by the Zener diode.

9. The switching control circuit according to claim 1, wherein the detection period starts after the soft start period has elapsed.

10. The switching control circuit according to claim 1, wherein the detection period starts after a power supply voltage equal to or higher than a predetermined voltage has been input into the switching control circuit and the semiconductor integrated circuit has started to operate.

11. The switching control circuit according to claim 1, wherein the detection period ends after a power supply voltage equal to or higher than a predetermined voltage has been input into the switching control circuit and the output terminal has started to output a control signal used to control the switching element.

12. The switching control circuit according to claim 1, further comprising a constant-current circuit arranged to supply a constant current to the soft start terminal.

13. The switching control circuit according to claim 1, further comprising a maximum ON time limiting device arranged to set a limit value of an ON time of the switching element during a normal operation in accordance with the determination target signal corresponding to a voltage lower than a voltage at which the first overcurrent protection section operates.

14. The switching control circuit according to claim 13, wherein the maximum ON time limiting device is arranged to detect a voltage induced by a resistor included in the external circuit and sets a limit value of the ON time in accordance with the induced voltage.

15. The switching control circuit according to claim 14, wherein the external circuit includes an upper limit setting circuit arranged to determine an upper limit of a voltage at the soft start terminal.

16. The switching control circuit according to claim 15, wherein the upper limit setting circuit includes a Zener diode.

17. The switching control circuit according to claim 1, wherein the switching control circuit is in the form of an IC chip.

18. A switching power supply apparatus comprising the switching control circuit according to claim 1.

19. The switching power supply apparatus according to claim 18, wherein the switching control circuit is located at the power conversion circuit.

20. The switching power supply apparatus according to claim 18, wherein the switching control circuit is in the form of an IC chip.

\* \* \* \* \*